R. E. POWELL.
CHARGING RACK.
APPLICATION FILED OCT. 1, 1920.
1,425,689.
Patented Aug. 15, 1922.
4 SHEETS—SHEET 3.
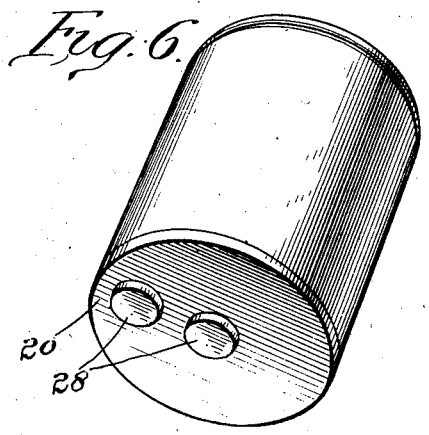
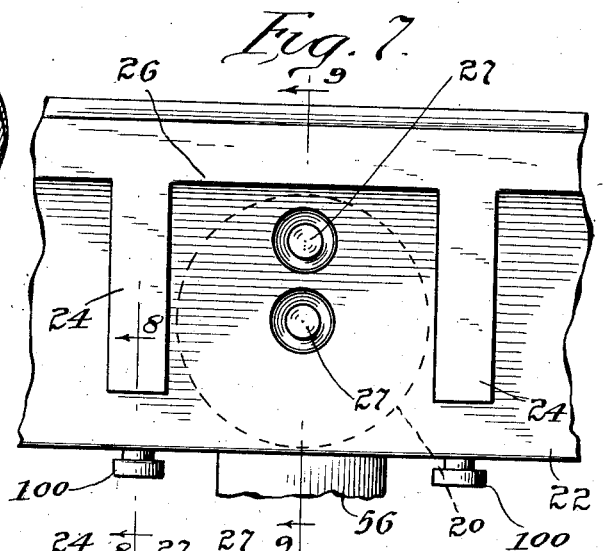
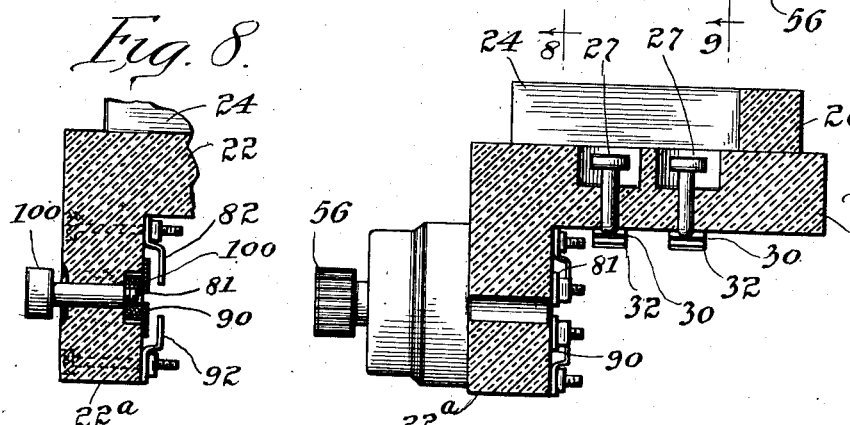
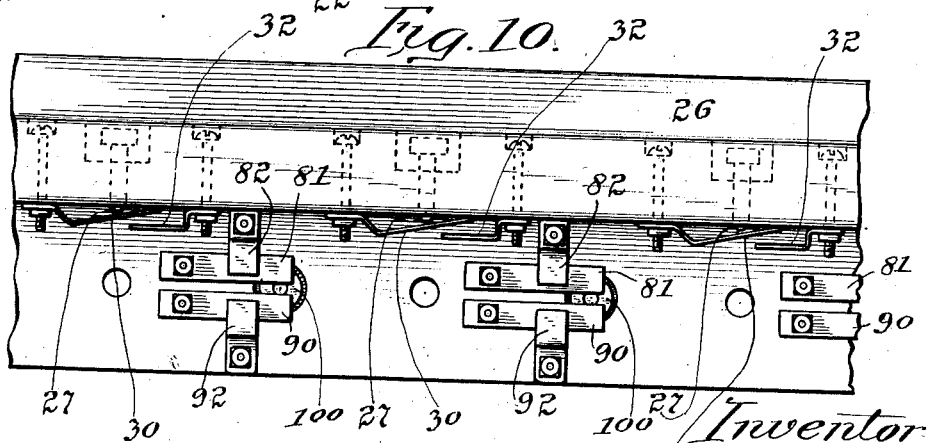
Inventor
Raymond E. Powell
By Cheever & Cox
Attys.

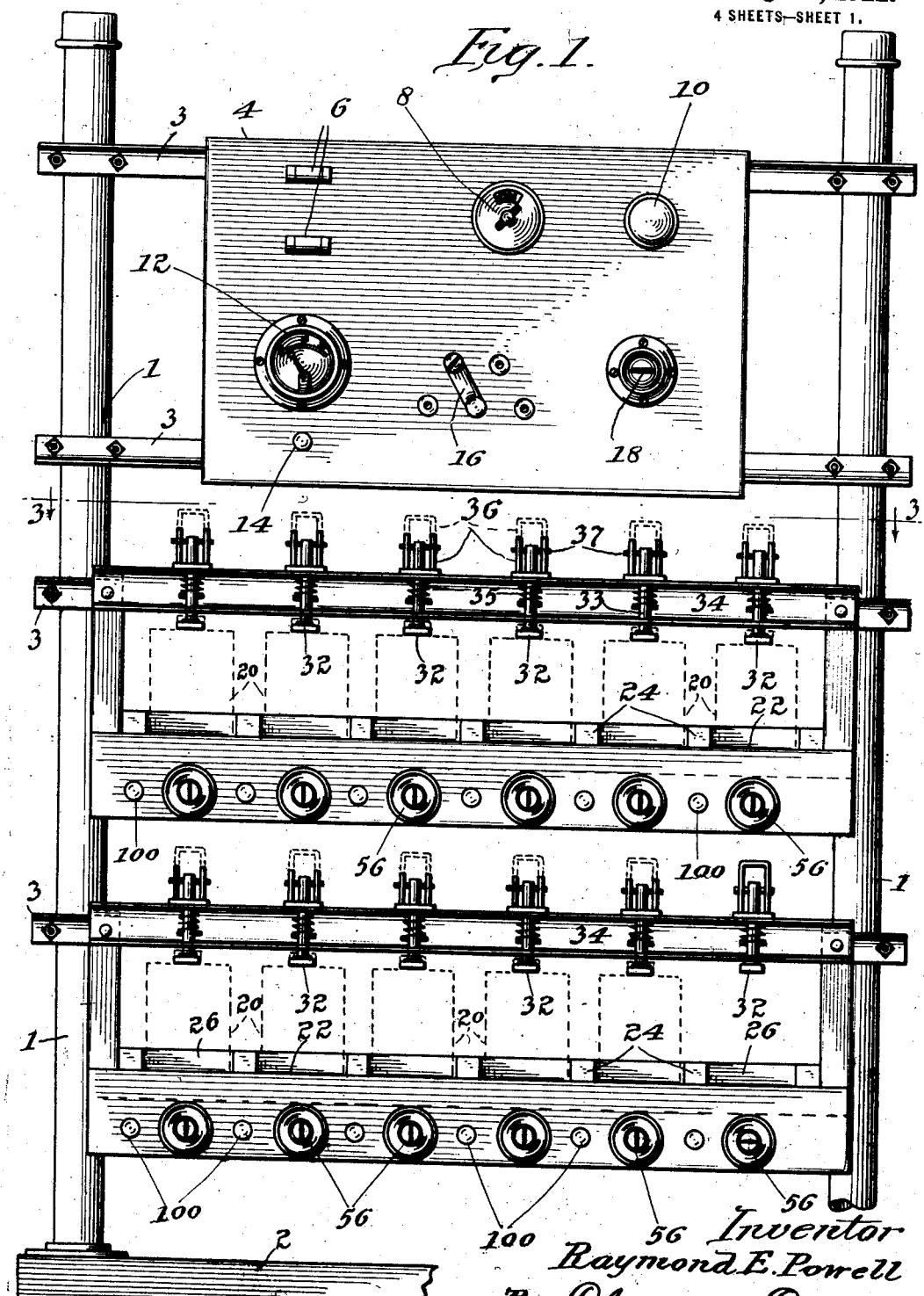

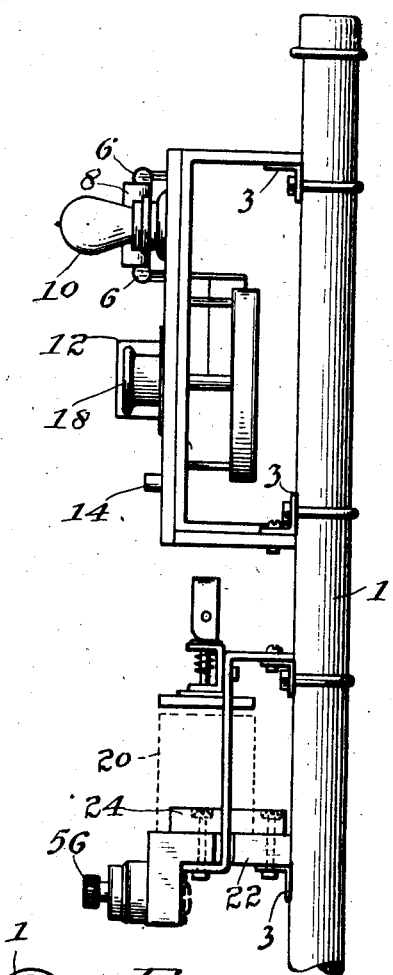
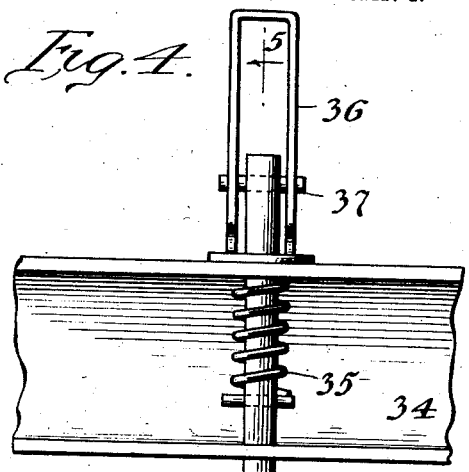
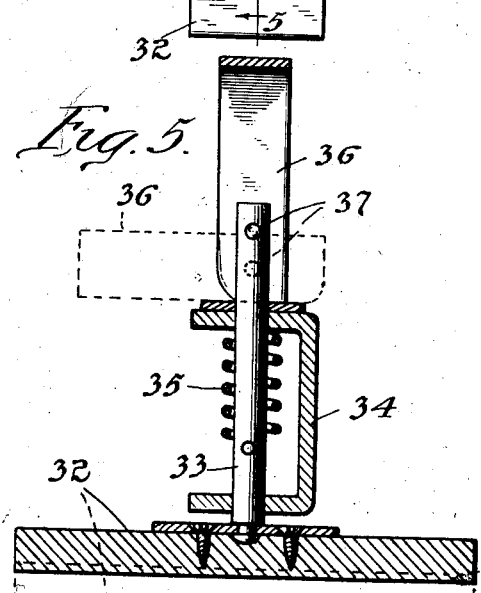
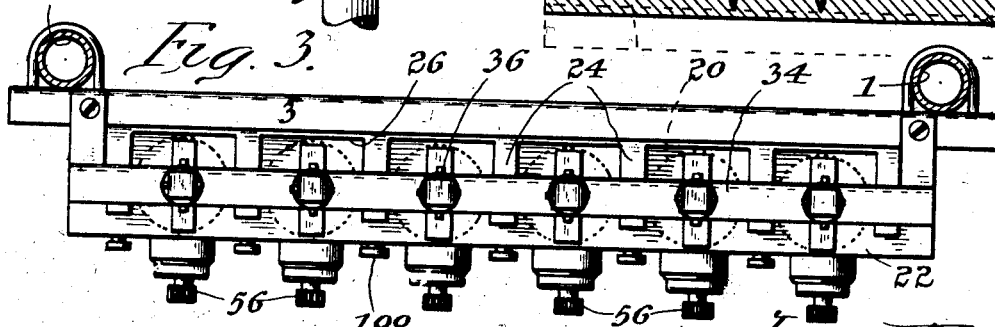

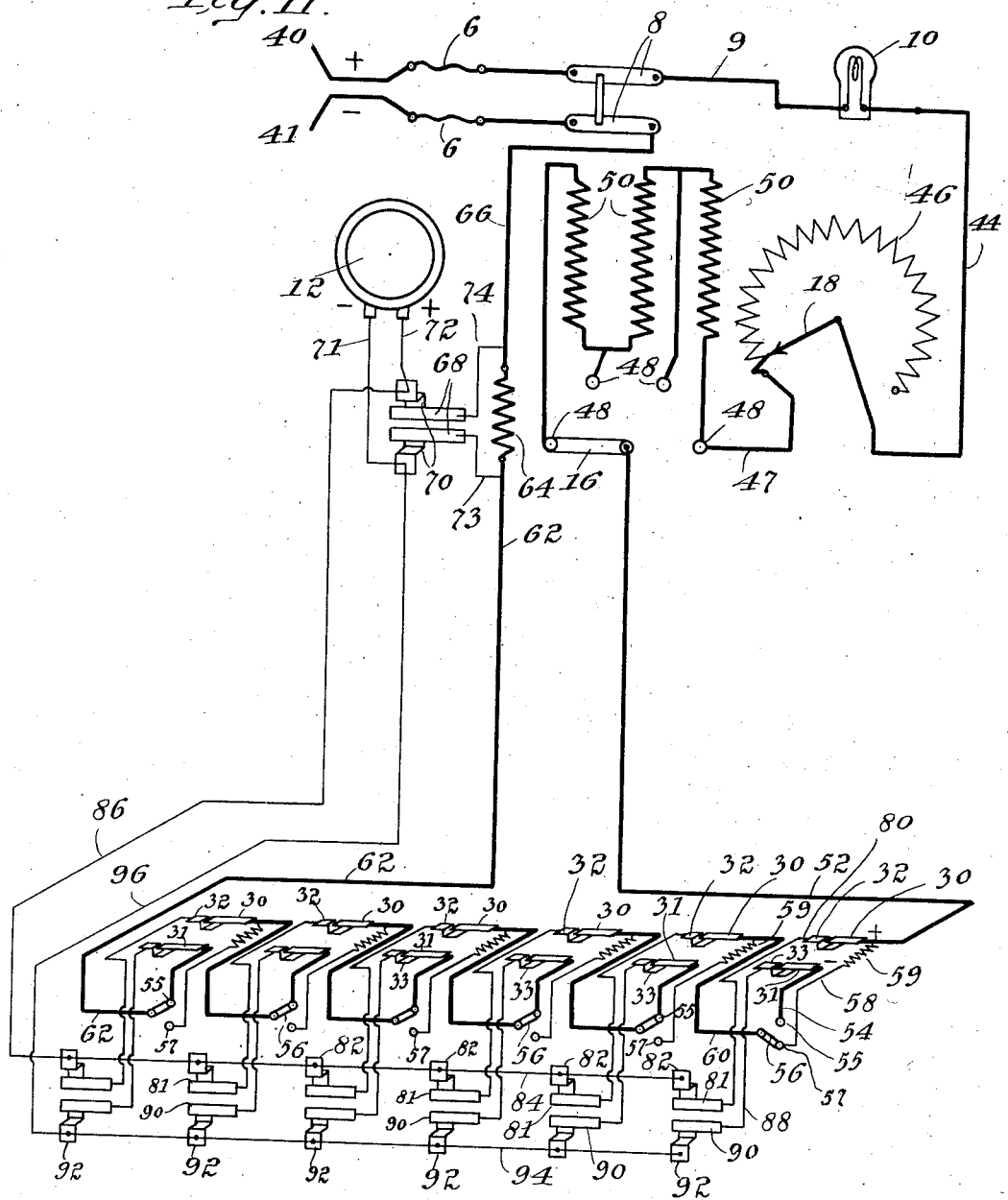

UNITED STATES PATENT OFFICE.

RAYMOND E. POWELL, OF CHICAGO, ILLINOIS, ASSIGNOR TO FEDERAL ELECTRIC COMPANY, OF CHICAGO, ILLINOIS, A CORPORATION OF ILLINOIS.

CHARGING RACK.

1,425,689.  Specification of Letters Patent.  Patented Aug. 15, 1922.

Application filed October 1, 1920. Serial No. 414,037.

*To all whom it may concern:*

Be it known that I, RAYMOND E. POWELL, a citizen of the United States, residing at Chicago, in the county of Cook and State of Illinois, have invented a certain new and useful Improvement in Charging Racks, of which the following is a specification.

My invention relates to apparatus for charging, from a direct current, commercial circuit of 100 volts or more, storage batteries of small sizes, such for example, as are used in hand lamps and in other situations calling for units of low capacity. The general object of this invention is to provide apparatus of this character which shall be practical, easy to operate, and eliminate all danger of ruining either the apparatus itself or the batteries on charge. Among the specific objects, it is my purpose to provide convenient charging pockets for receiving the batteries and enabling them to be readily inserted into or withdrawn from the charging circuit. Another object is to provide apparatus so constructed that the battery units may be withdrawn or inserted individually and in any conditions of charge or discharge without interrupting the charging process of the other units to any appreciable extent. Another object is to provide a rack so constructed that it may be used simply as a place to keep batteries after they have been charged but are not required for immediate use; that is in my rack batteries may be simply stored without interfering with the charging of other batteries in the rack. Another object is to provide a rack which will take advantage of the weight of the battery for increasing the efficiency of contact of the battery terminals with the terminals in the charging pockets. Still another object is to provide convenient and efficient means for clamping the batteries in position in the pockets. Another object is to provide means whereby the individual units may be easily and instantly tested to inform the attendant the state of charge or discharge of the individual units. Another object is to provide apparatus in which a compensating resistance may be thrown in circuit to take the place of any absent battery and to provide means which will automatically prevent the operator from throwing the test apparatus into circuit when the compensating resistance instead of the battery is in place, in other words, to provide a construction which will prevent the measuring instrument from being thrown across the charging terminals in the battery pockets unless a battery is in position. Another object is to provide connections such that a voltmeter may be employed both for indicating the strength of charging current of the apparatus as a whole, and also the counter E. M. F. of any individual battery.

I accomplish my objects by the mechanism illustrated in the accompanying drawings in which Figure 1 is a front elevation of the rack embodying my invention.

Figure 2 is an end elevation of the upper portion of the rack.

Figure 3 is a plan section on the line 3—3, Figure 1.

Figure 4 is a front elevation of the pressing mechanism for holding the individual batteries in position in the charging pockets.

Figure 5 is a cross section on the line 5—5, Figure 4.

Figure 6 is a perspective view of the form of battery intended to be accommodated by this particular design of apparatus.

Figure 7 is a top plan view of a charging pocket.

Figure 8 is a sectional detail on the line 8—8, Figure 7.

Figure 9 is a sectional detail on the line 9—9, Figure 7.

Figure 10 is a view from the back of the rack showing the relation of the charging pockets and associated parts to the testing switches.

Figure 11 is a wiring diagram of the apparatus.

Like numerals denote like parts throughout the several views.

In the particular embodiment of the invention illustrated the rack has a framework consisting of uprights 1 mounted upon a base 2. The uprights support cross bars 3 which carry the various operating parts of the apparatus. The upper pair of bars supports a panel 4 carrying various indicating and controlling parts, including fuses 6, a main switch 8, a telltale lamp 10, a voltmeter 12, a main meter switch 14 for throwing the meter into and out of circuit, a resistance controller arm 16 and a variable resistance switch 18. The function and relation of these parts will be referred to hereinafter.

The rack is furnished with battery pockets for receiving the batteries 20 to be charged. These pockets may assume various forms, in the present case consisting merely of shelves 22 bolted or otherwise secured to the uprights, as best shown in Figure 2, and provided with partitions 24 extending forward from back walls 26 and thus forming stalls or pockets which are open at the front, as best shown on an enlarged scale in Figures 7 and 9. The shelves 24 form the floors of the pockets and are provided with contact terminals 27 adapted to engage the terminals 28 of the batteries. The particular design of charging apparatus illustrated is intended to charge so-called "dry storage batteries" of a type now commercially in use for train lanterns and similar purposes. These batteries have their terminals at the bottom, as suggested in Figure 6. Hence in the present design the terminal contacts are mounted in the bottom of the pockets. These contacts in the type shown consist of vertically slidable push pins which penetrate the shelves and rest upon spring contacts 30, 31 as best shown in Figures 9 and 10. These contactors normally stand in raised, open position. When the battery is lowered into a pocket it pushes down on the pins 27 and causes the contactors 30, 31 to engage stationary terminals 32, 33. As will be hereinafter explained, the descent of the battery terminals onto the pins 27 first puts the battery in series in the charging circuit, after which the descent of the contactors 30, 31 onto the terminals 32, 33 inserts the battery into a testing circuit so that when the testing switch (presently to be described) is closed, the meter 12 will be connected across the battery terminals.

In order to hold the battery down in close contact with the charging terminal pins 27, presser mechanism is provided which is illustrated in detail in Figures 4 and 5. This mechanism includes a plate 32 adapted to press down on the top of the battery. It is mounted upon a stem 33 which is vertically slidable in a stationary guide 34. A helical spring 35 constantly urges the stem downward. A cam lever 36 is pivoted to the upper end of the stem by a pin 37 and the construction is such that when the lever is in upstanding position, as shown in full lines in Figures 4 and 5, the stem and its presser plate 32 will be held elevated against the force of the spring 35. When the lever is lowered to horizontal position shown in dotted lines in Figure 5, the stem and plate will be permitted to descend under the action of the spring and thus hold the battery firmly in engagement with the charging terminals. It will also hold the contacts 30 down in close engagement with the stationary contacts 32.

I will now explain the electrical characteristics of the invention, and for the purpose will refer principally to the wiring diagram, Figure 11. The parts conventionally illustrated in the diagram bear the same reference numerals as they do where physically illustrated in Figures 1 to 10:

The charging current is supplied through the main line conductors 40, 41 which constitute part of a commercial circuit having in the present case a voltage of approximately 110. These conductors lead through the fuses 6 previously mentioned to the main service switch 8 previously mentioned. One side of switch 8 is connected by a conductor 9 to the telltale lamp 10 previously mentioned. The conductor 44 leads from the lamp to the switch arm 18 of the variable resistance 46. This resistance is connected by a conductor 47 to the first of a set of stationary contacts 48 which cooperate with the controller arm 16 previously mentioned to insert or cut out of circuit units 50 of resistance. In brief, the parts 16 and 18 with their associated resistances simply form means for inserting the proper amount of resistance into the charging circuit.

Connected to the center of the controller arm 16 is a conductor 52 which leads to the various charging pockets and constitutes one side of the charging circuit. It will be understood that in my apparatus the charging pockets are arranged in series in the charging circuit and hence conductor 52 leads to and is connected with the first contactor 30 of the series (shown at the right end of the diagram). When the battery is in place it forms a part of the electric circuit and connects the spring contactor 30 with the companion spring contactor 31. The latter is connected by a conductor 54 to a stationary contact 55 adapted to cooperate with the arm 56 of a compensating switch. Said arm is also adapted to engage a stationary contact 57 which is connected by a conductor 58 through a compensating resistance 59 to the conductor 52. Hence it follows that when the arm is in engagement with the contact 55 (which will be called "battery position") the charging circuit will be closed through the battery; and when said arm is in engagement with the contact 57 (which will be called the "compensating position") the charging circuit will be closed through the compensating resistance 59. The arm and its contacts therefore constitute a two-position compensating switch capable of closing the charging circuit either through the battery or through the compensating resistance. This resistance is designed to be of substantially equal value to the apparent resistance of the battery. According to one use of the apparatus the charging current will be maintained at about one ampere and the counter E. M. F. or apparent resistance of the battery will range between 2 and 2.6 volts and hence the compensating resistance will have a value of approximately 2½ ohms. This ohmic resistance is about equal to the average resistance value of the battery.

A conductor 60 leads from the center contact of the compensating switch 56 to the second spring contactor 30 of the series and also to a second resistance 59 similar in value and purpose to the one bearing the same reference numerals as just described. A second compensating switch 56 is provided and operates in the same manner and for the same purpose as the one previously described. These parts are duplicated for each charging pocket and according to the present design there are 40 of these pockets altogether, all of which are similarly equipped. The last compensating switch of the series is connected by a conductor 62 through a resistance 64 and conductor 66 to the remaining side of the main service switch 8 previously described. This completes the main charging circuit.

In order to test the charging current of the apparatus as a whole a main charging switch 14, previously mentioned, is provided. The push button which operates this switch is shown in Figures 1 and 2. The construction and arrangement of the operating parts of this switch are shown conventionally at the upper part of the diagram in which two spring contactors 68, which are in reality located behind the push button and adapted to be pushed backward by it, are arranged in front of a pair of stationary contacts 70 which are connected by conductors 71 and 72 to the terminals of the voltmeter 12. The spring contactors 68 are connected by conductors 73 and 74 to the two ends of the resistance 64. The value of the resistance 64 is known (in the present case being preferably equal to one ohm). Hence by depressing the contactors 68 the voltmeter becomes connected across the resistance thus making it possible to measure the drop in voltage through the resistance and consequently to readily compute the value of the current flowing in the charging circuit.

I will now describe the means for testing each individual battery:

Leading from each of the stationary terminals 32 is a conductor 80 which leads to a spring contactor 81 adapted to cooperate with a stationary contact 82. There is a set of these stationary contacts, one for each charging pocket, and they are all connected by a conductor 84 to a conductor 86 which leads to the stationary terminal 70 above described. The companion stationary terminals 33 are connected by conductors 88 to spring terminals 90. These latter form companions to the spring terminals 81 and are adapted to engage stationary terminals 92 which form companions to the stationary contacts 82. The contacts 92 are connected by a conductor 94 to a conductor 96 which leads to the stationary terminal 70. Thus it will be seen that if the normally open spring contacts 81, 90 are pressed into engagement with the contacts 82, 92 respectively, the voltmeter will be connected across the terminals of the battery in the associated pocket. The parts 81, 82, 90 and 92 are shown physically in Figures 8, 9 and 10 of the drawings. These figures and others also show the push buttons 100 by which the spring contactors 81, 90 may be pushed into engagement with their cooperating contacts 82, 92 respectively. Said push buttons are slidably mounted in the aprons 22ª of the shelves and when any button is depressed (pushed backward) it will throw the voltmeter across the terminals of the battery in the associated pocket.

Operation: To give a concrete example:

Let it be assumed that the voltage across the supply lines 40, 41 is 110 volts, which is a common commercial voltage. Let it also be assumed that the batteries are such that they should be charged at the rate of approximately one ampere and that their E. M. F. or apparent resistance ranges approximately from 2 to 2.6 volts. Under these conditions the rack is designed with about 40 pockets, and as each pocket will have either a battery or a compensating resistance in circuit, the total resistance or apparent resistance will be equal to about 100 ohms when the batteries are fully charged. The balance of the resistance in order to cut down the voltage to one ampere, is made up by the resistance 46, 50 controlled by the arms 18, 16 respectively. As previously pointed out, the act of inserting a battery into a pocket first puts the battery in electric connection with the spring contactors 30, 31, thus putting the battery in series in the charging circuit. A continuation of the act causes the spring contactors to engage the stationary terminals 32, 33 respectively, thus connecting the battery with the spring contactors 81, 90 of the associated testing switch. As a prerequisite to supplying current from the charging circuit to the battery it is necessary that the associated compensating switch 56 be in "battery position"—that is, in engagement with the stationary contact 55. If this switch is not in engagement with the contact 55, the only other way the charging circuit can be closed is to put the switch arm into engagement with the contact 57 thus closing the charging circuit through the compensating resistance 59. Unless the switch arm 56 is in one of these two positions the charging circuit will be open and the telltale lamp 10 will fail to glow.

It will be noted that the charging circuit is not closed unless all of the compensating switches are in either battery position or compensating position. Also that in case the switch is in "battery position" the charging circuit will not be closed unless a battery be in place in the pocket. If the battery is absent there will be nothing to electrically connect the two spring contactors 30, 31, and the charging circuit will remain open. Thus in order for the rack to operate at all the compensating switches must be either in position to insert the compensating resistances 59 or must be in "battery position" with batteries in place in the pockets. Consequently there is no danger that an operator will remove a battery from the rack and fail to insert a compensating resistance and thus cause an excessive charging current, for if he fails to insert the corresponding compensating resistance no charging current will be supplied and this fact will be indicated by the failure of the telltale lamp to glow.

Suppose, now, that the attendant wishes to find out the state of charge or discharge of any particular battery. All he has to do is to press the push button 100 associated with the pocket in which the battery is located. This throws the volt-meter across the battery terminals and as the value of the charging current is known and as the drop in voltage across the battery terminals will be indicated by the voltmeter, the apparent resistance or counter E. M. F. of the battery may thus be read directly from the voltmeter. To illustrate, if the voltmeter gives a reading of 2½ volts, the operator will know that the battery is giving a counter E. M. F. of 2½ volts and that consequently it is sufficiently charged so that it may be properly withdrawn for use.

To determine the strength of the total charging current it is simply necessary to close the main testing switch 14, 68, 70. The resistance of the meter shunt 64 being one ohm, the voltmeter readings will indicate directly the strength of the charging current in amperes. From the foregoing it will be evident that an ordinary commercial voltmeter may be employed for indicating the strength of the total charging current and also the condition of charge or discharge of the individual batteries in the rack.

It will also be noted that there is no possibility of damaging the voltmeter by placing an excessive voltage across its terminals for example by throwing a compensating switch to battery position when no battery was present in the associated pocket. If a battery is not in place the voltmeter cannot be placed on closed circuit regardless of the position of the compensating switch.

Another characteristic of my apparatus is that it forms a convenient place for storing batteries that have been damaged or have been charged, but are not required for immediate use. The mere insertion of a battery does not put it in circuit unless the associated compensating switch 56 is closed and, hence, if the attendant desires to store batteries not required at the moment, he can simply throw the compensating switch away from "battery position" and then insert it at will without in any way affecting the charging process of the other batteries in the rack.

Having thus described my invention, what I claim as new and desire to secure by Letters Patent is:

1. Battery charging apparatus having a charging circuit, a plurality of charging pockets adapted to receive the batteries to be charged and to put them in series in the charging circuit, meter circuits, one for each pocket, each meter circuit being controlled partially by a normally open switch adapted to be closed by the battery when the latter is inserted into a pocket whereby the meter cannot be put onto closed circuit unless the battery is in place, and partially controlled by a manually operated testing switch, whereby even though a battery be in place, the meter will not be on closed circuit except while the testing switch is closed.

2. Battery charging apparatus having a charging circuit, a plurality of charging pockets adapted to receive the batteries to be charged, and to put them in series in the charging circuit, and meter circuits, one for each pocket, each meter circuit being controlled partially by a normally open switch adapted to be closed by the battery when the latter is inserted into a pocket, and partially controlled by a normally open, manually operated testing switch.

3. Battery charging apparatus having a meter and a plurality of meter circuits connected to it, each meter circuit having terminals and a manually controlled testing switch by which electric connection between said terminals and the meter may be made or broken, a charging circuit, charging pockets adapted to receive the batteries to be charged, said pockets having movable contactors and the contactors of the different pockets being arranged in series in the charging circuit, said contactors being adapted to be engaged by the battery terminals as the battery enters a pocket and prior to the final seating of the battery in the pocket for establishing electric connection between the battery terminals and the charging circuit, the contactors being adapted to be moved into engagement with the meter circuit terminals by the battery as the latter moves into final seated position in the pocket, whereby the battery is necessarily connected to the charging circuit before the meter can be energized.

4. Battery charging apparatus having a voltmeter, a main charging circuit, a plurality of charging pockets adapted to receive the batteries and put them in series in the charging circuit, a known resistance arranged in the main circuit to form a voltmeter shunt, a main testing switch for throwing the voltmeter into and out of circuit relation with said known resistance, a plurality of separate battery testing circuits, one for each pocket, a normally open switch for controlling each testing circuit, and means for connecting each testing circuit across the terminals of the battery when the latter is in position in the pocket.

5. Battery charging apparatus having a meter and a plurality of meter circuits connected to it, each meter circuit having terminals and a manually controlled testing switch by which electric connection between said terminals and the meter may be made or broken, a charging circuit, charging pockets adapted to receive the batteries to be charged, said pockets having movable contactors and the contactors of the different pockets being arranged in series in the charging circuit, push pins in the pockets adapted to be engaged by the battery terminals as the battery enters a pocket, said push pins being adapted to engage said contactors to first put the contactors into electric connection with the battery, and said pins being adapted to push the contactors into engagement with the meter circuit terminals as the battery moves to final seated position in the pocket for thus finally throwing the meter across the terminals of the battery for testing the latter.

In witness whereof, I have hereunto subscribed my name.

RAYMOND E. POWELL.